United States Patent [19]

Nanba et al.

[11] Patent Number: 5,742,857
[45] Date of Patent: Apr. 21, 1998

[54] SYSTEM FOR REPRODUCING FILM IMAGE

[75] Inventors: Katsuyuki Nanba, Osakasayama; Hirokazu Yagura, Sakai, both of Japan

[73] Assignee: Minolta Co, Ltd., Osaka, Japan

[21] Appl. No.: 869,988

[22] Filed: Jun. 5, 1997

Related U.S. Application Data

[63] Continuation of Ser. No. 294,649, Aug. 23, 1994, abandoned.

[30] Foreign Application Priority Data

Aug. 25, 1993 [JP] Japan ................... 5-210274

[51] Int. Cl.$^6$ ................... G03B 17/24; G03B 1/00
[52] U.S. Cl. ................... 396/319; 396/407; 396/408; 396/410
[58] Field of Search ................... 354/105, 106, 354/173.1, 173.11, 75, 76; 355/75, 76; 396/389, 390, 392, 408, 407, 410, 310, 311, 319

[56] References Cited

U.S. PATENT DOCUMENTS

| | | |
|---|---|---|
| 4,303,950 | 12/1981 | Taniguchi et al. . |
| 4,482,294 | 11/1984 | Brownstein . |
| 4,678,743 | 7/1987 | Yamada ................... 430/551 |
| 4,786,971 | 11/1988 | Kaneko et al. ................... 358/209 |
| 4,994,833 | 2/1991 | Cocca ................... 354/207 |
| 5,017,326 | 5/1991 | Wash et al. ................... 354/207 |
| 5,083,214 | 1/1992 | Knowles . |
| 5,117,317 | 5/1992 | Suzuki ................... 360/74 |
| 5,194,892 | 3/1993 | Robison ................... 355/40 |
| 5,196,859 | 3/1993 | Tomiyama . |
| 5,220,367 | 6/1993 | Matsuyama ................... 354/105 |
| 5,245,372 | 9/1993 | Aoshima . |
| 5,264,683 | 11/1993 | Yoshikawa . |
| 5,335,038 | 8/1994 | Blackman et al. ................... 354/319 |
| 5,345,286 | 9/1994 | Stiehler ................... 354/173.1 |

FOREIGN PATENT DOCUMENTS

| | | |
|---|---|---|
| A4134978 | 5/1992 | Japan . |
| 4-291249 A | 10/1992 | Japan . |
| 90/04302 | 4/1990 | WIPO . |

*Primary Examiner*—Safet Metjahic
*Assistant Examiner*—Christopher E. Mahoney
*Attorney, Agent, or Firm*—Burns, Doane, Swecker & Mathis, LLP

[57] ABSTRACT

A mechanism, for reproducing images of a developed film, which reads film information recorded in a magnetic track formed along a pair of edges extending longitudinally of a leader of the film. The reading of the magnetic track is carried out by pressing a magnetic head against the magnetic track of the film leader at the time of rewinding into a cartridge case the film which is once fed out a predetermined length from the cartridge case. When the film is rewound into the cartridge case at the time of reading the film information, the surface of the film leader is pressed by the magnetic head uniformly because the film leader is tightened even and flat by a tension working between the cartridge case and the magnetic head.

38 Claims, 8 Drawing Sheets

SYSTEM FOR REPRODUCING FILM IMAGE

This application is a continuation of application Ser. No. 08/294,649, filed Aug. 23, 1994, abandoned.

BACKGROUND OF THE INVENTION

1. Field of the Invention

The present invention generally relates to a system for reproducing film images recorded in a developed film having a recording area in which various types of film information are recorded, and particularly relates to a mechanism for reading the film information recorded therein.

2. Description of the Related Art

Conventionally, there has been proposed a system comprising: a film cartridge having a cartridge case, for displaying an "UNEXPOSED", "EXPOSED", "DEVELOPED (or PROCESSED)" or the like, within which a film having a recording area, as in a form of a magnetic track provided therein, for recording film information is rewound up to a tip of a leader thereof when the cartridge is taken outside a camera; the camera which has a function to record in the recording area of the film various types of photographing and developing information such as information upon trimming, flashing, the number of prints and the like at the time of picture taking; and an image reproducing apparatus for reproducing film images recorded in the developed film housed in the film cartridge in accordance with the above photographing and developing information, information upon the whole film used for dealing with the images to be reproduced (for example, information upon shading of the film-base, information upon the exposure set at the time of picture taking, information upon the number of background music and the order in which they are played, and the like), and/or its reproducing condition, including the above information upon the whole film, for determining the reproducing time of the film image or how to play the background music, respectively assigned in each of blocks marked off in one film.

The magnetic tracks are provided along edges extending longitudinally of the film. The photographing and developing information is recorded in the tracks disposed corresponding to each frame of the film, whereas the information upon the whole film or the reproducing condition is recorded in the tracks disposed in the film leader.

The mechanism, for reading the film information, provided in the above image reproducing apparatus, is so constructed that, as the film information recorded in the tracks of the leader is read, the track surface of the film leader is touched and pressed by the magnetic head, and then the reading operation of the film information is carried out while the film leader is being pushed out from the cartridge case towards a film-winding spool provided in the apparatus.

However, the film leader has some flexibility; therefore, in case that the rigidity of the film leader is overcome by the pressing force of the magnetic head against the leader at the time when the leader is being pushed outside the cartridge case with the leader being pressed by the magnetic head, an error of misreading the film information may occur as a result that the track surface of the film leader gets uneven and is not toughed by the magnetic head uniformly.

SUMMARY OF THE INVENTION

Accordingly, one object of the present invention is to provide a system for reproducing film images having a film cartridge and an image reproducing apparatus the mechanism for reading the film information of which, surely and reliably, reads the film information from the film leader.

Another object of the present invention is to provide a method of reading the film information, surely and reliably.

In accomplishing these objects of the present invention, there is provided a system for reproducing film images, which comprises a film cartridge which has a length of film, a leader of which has a recording area for recording film information; a film-feeding mechanism for feeding the film selectively from a cartridge case of the film cartridge to a film-winding spool and from the film-winding spool to the cartridge case; and a reading mechanism for reading the film information of the leader while the film is being fed from the film-winding spool to the cartridge case by the film-feeding mechanism.

With this construction, when the film is fed from the film-winding spool to the cartridge case at the time of reading the film information, the surface of the film leader is touched and pressed by the reading mechanism substantially uniformly because the film leader is stretched or tightened even and flat by a tension working between the cartridge case and the reading mechanism, so that misreading the film information is surely prevented.

In the above construction, the recording area for recording film information may be sandwiched in between a tip of the leader and the recording area for recording the film image, which is developed, disposed nearest to the tip of the leader; the recording area for recording the film image may be read by a photoelectric transfer element; the photoelectric transfer element and the film-reading mechanism may be located along a passage of the film; the recording area of the leader for recording film information may comprise a magnetic recording medium; and the reading mechanism may comprise a magnetic head or sensor.

Preferably, the system comprises a controller which controls the film-feeding mechanism so that, after a predetermined length of the film is fed from the cartridge case to the film-winding spool, the film is fed from the film-winding spool to the cartridge case. The predetermined length of the film is the length making the leader thereof pass the reading mechanism for enabling the reading mechanism to read the film information of the leader when the film is rewound inside the cartridge case. In this construction, the system may further comprise a sensor, electrically connected to the controller, which detects if the film is wound round the film-winding spool, wherein the predetermined length of the film is fed from the cartridge case to the film-winding spool when the sensor detects that the film is wound round the film-winding spool.

Preferably, the controller controls the film-feeding mechanism so that the film is fed again from the cartridge case to the film-winding spool, after the film information of the leader is read by the reading mechanism.

The method of the present invention, designed to read the film information, comprises feeding the film from the cartridge case to the film-winding spool; stopping feeding the film to the film-winding spool when it is detected that the film is fed out of the cartridge case a predetermined amount; feeding the film back to the cartridge case; reading the film information from the recording area of the film by a reader which reads the information while the film is being rewound inside the cartridge case; and feeding the film from the cartridge case to the film-winding spool again after completion of reading the film information.

In this method, the photographed image of the film can be read by a photoelectric transfer element.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE INVENTION

Figure 1:
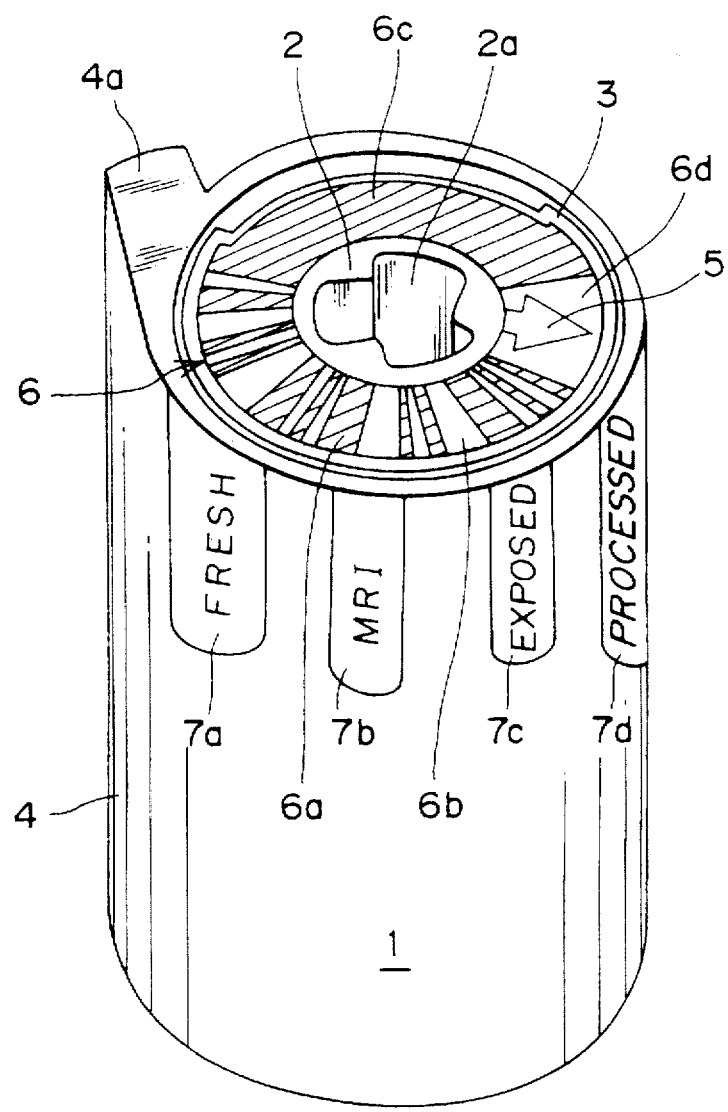
FIG. 1 is a general, perspective view of a film cartridge of a system for reproducing film images according to the embodiment of the present invention.

Before the description of the present invention proceeds, it is to be noted that like parts or corresponding parts are designated by like reference numerals throughout the accompanying drawings.

Referring to FIGS. 1 through 7, description is made below on a system for reproducing film images according to a preferred embodiment of the present invention. The mechanism for reading the film information is provided in an image reproducing apparatus, one part of the system, for reproducing film images recorded in a developed film of a film cartridge, the other part of the system, having a magnetic track in which various types of film information, such as information upon photographing conditions, dates, exposure conditions or the number of prints, the above mentioned information upon the whole film used for dealing with the images to be reproduced, and information upon the above mentioned reproducing conditions, are recorded. The mechanism for reading the film information is intended for reading film information recorded in the magnetic track provided in the film leader.

Figure 2:
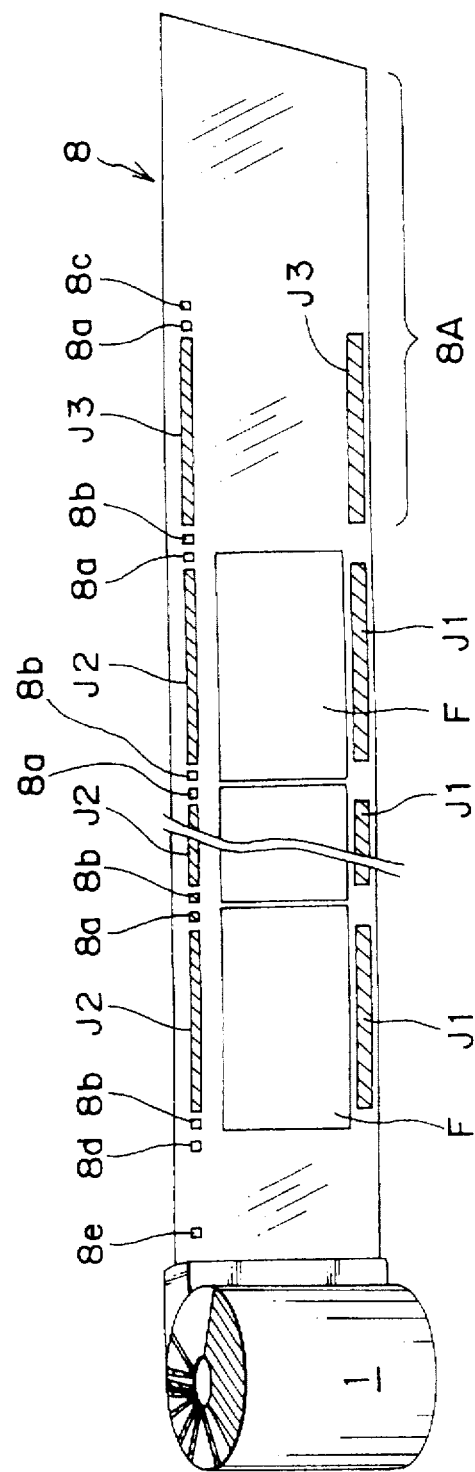
FIG. 2 is an explanatory, perspective view showing a state in which a film is pulled out of a cartridge case of the film cartridge shown in FIG. 1.
Figure 4:
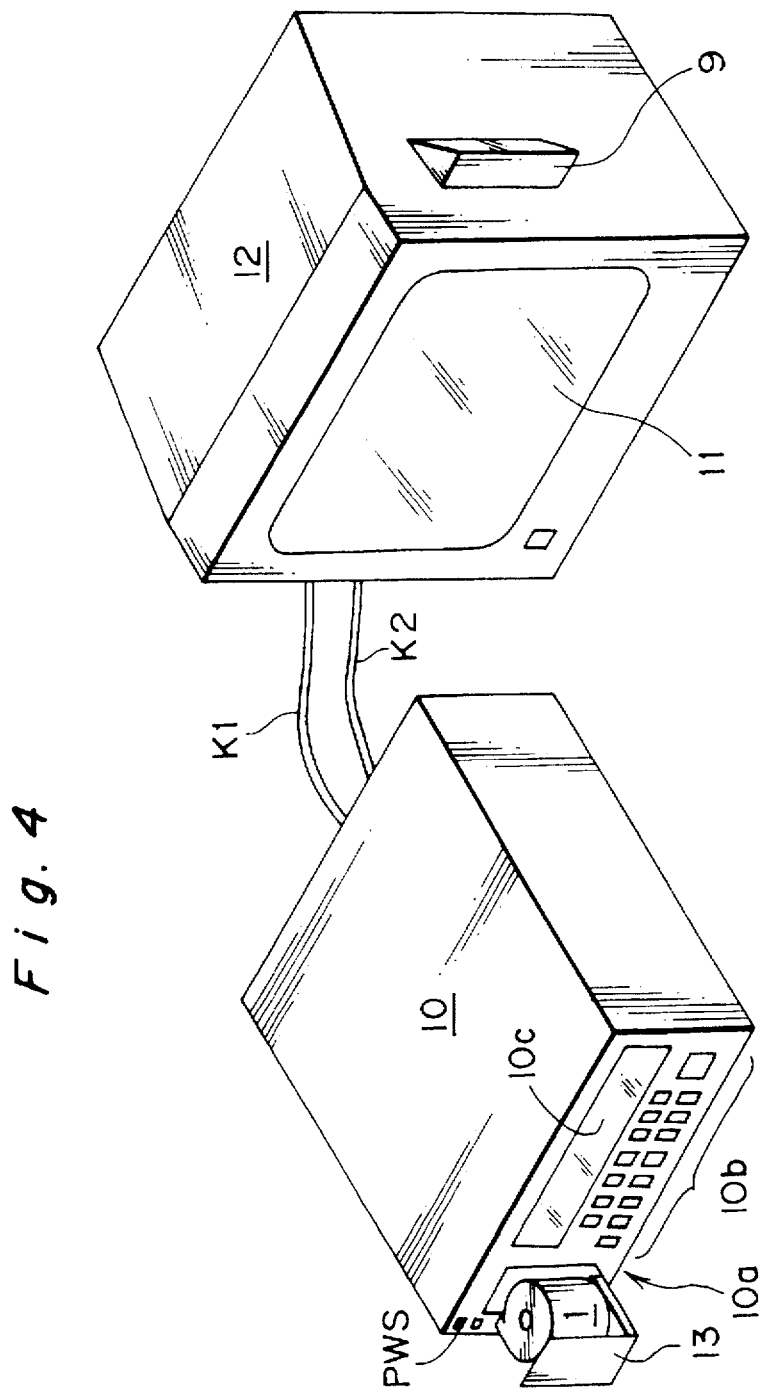
FIG. 4 is a general, perspective view showing the system for reproducing film images.

FIG. 1 shows a film cartridge used as one part of the system, and FIG. 2 shows a state in which a film 8 is pulled out of a cartridge case 4 of the cartridge 1. This film cartridge 1 is of a type that the film 8 is always wound around its spool 2 up to a tip of a leader 8A thereof inside the cartridge case 4 when it is not set inside the image reproducing apparatus 10 (See FIG. 4.). On the other hand, the image reproducing apparatus 10 has an automatic film-loading mechanism which makes it possible that, when the apparatus 10 is loaded with the film cartridge 1, the film 8 is fed out of the cartridge case 4 and it is wound around a film-winding spool provided in the apparatus automatically. The appearance of the image reproducing apparatus 10 is shown in FIG. 4.

As shown in FIG. 1, the film cartridge 1 has a data disk 3, a bar code 6 of which indicates some kinds of information such as information upon a sensitivity of the film 8 and the number of frames F thereof. The data disk 3 is fixed to an edge portion of the spool 2 and it is disposed along an outer surface of the cartridge case 4. The data disk 3 has a non-circular driving hole 2a which is constructed so as to engage with a film-rewinding fork provided in the apparatus 10. For convenience' sake in the specification, narrower black parts shown on the data disk 3 by hatches and narrower white parts in the figure are designated bars 6a and spaces 6b, respectively, whereas the widest black part and the widest white one in the figure are designated a black zone 6c and a quiet zone 6d, respectively. As shown in FIG. 1, on the data disk 3 are shown eleven bars 6a and eleven spaces 6d in two different widths, respectively: wider bars 6a and wider spaces 6b are designated "wide", respectively, whereas narrower bars 6a and narrower spaces 6b are designated "narrow", respectively. The above information upon the sensitivity of the film 8, the number of frames F or the like is determined by depending upon a combination of these bars 6a and spaces 6b. Incidentally, the bar 6a adjacent to the quiet zone 6d and the space 6b adjacent to the black zone 6c are shown "narrow", respectively, and in this embodiment, the data disk 3 has a construction that the ratio of "narrow" to "wide" is one to three.

On the surface of the data disk 3 is shown an arrow 5 as an indicia to indicate the rotational position of the data disk 3 with respect to the cartridge case 4. Also, on the outer surface of the cartridge case 4 are shown four different marks 7a, 7b, 7c and 7d: "FRESH" 7a which displays that the film 8 is quite new and no frames F are exposed to light; "MRI" 7b which displays that some frames F of the film 8 are exposed to light; "EXPOSED" 7c which displays that all the frames F are exposed to light; and "PROCESSED" 7d which displays that the film 8 is already developed and processed. The arrow 5 and the marks 7a–7d cooperate with each other to make it possible to display how the film 8 of the cartridge 1 is used by the user. That is, this construction of the film cartridge 1 makes it possible for the user to know that the cartridge 1 is new and no frame F is exposed to light if the data disk 3 is stopped with the arrow 5 pointing to the "FRESH" 7a, that some frames F are exposed to light if the disk 3 is stopped with the arrow 5 pointing to the "MRI" 7b, that all the frames F are exposed to light if the disk 3 is stopped with the arrow 5 pointing to the "EXPOSED" 7c, and that the film 8 is already developed and processed if the disk 3 is stopped with the arrow 5 pointing to the "PROCESSED".

As shown in FIG. 2, the film 8 housed in the cartridge case 4 has a construction that a first and second perforations 8a and 8b are formed, along an edge extending longitudinally of the film 8, corresponding to each frame F as a recording area for recording a film image, with the first perforation 8a disposed forward relative to the frame F and the second one 8b disposed backward relative thereto. Also, as shown in the figure, in the leader 8A of the film 8 are formed the first and second perforations 8a and 8b, ahead of the first frame F of the film 8, with no frame formed therein, and another additional perforation 8c is formed ahead of the first perforation 8a with the additional perforation 8c and the first perforation 8a being separated from each other with the same distance as that between the first and second perforations 8a and 8b adjacent to each other. Also, as shown in the figure, in the end part of the film 8 is formed no frame therein and still new perforations 8d and 8e are formed in this order behind the second perforation 8b of the last frame F with the new perforations 8d and 8e being separated from each other with a distance smaller than that between the first and second perforations 8a and 8b formed per each frame F.

Furthermore, as shown in FIG. 2, magnetic tracks J1, J2 and J3 are formed along edges extending longitudinally of the film 8. That is, along one edge of the film 8 opposite the other edge along which the perforations 8a–8e are formed is formed a magnetic track J1, formed between the first and second perforations 8a and 8b corresponding to each frame F, in which photographing information upon date, photographing conditions or the like is recorded; along the other edge of the film 8 is formed a magnetic track J2, formed between the first and second perforations 8a and 8b corresponding to each frame F, in which developing or processing information upon the number of prints, exposure conditions or the like is recorded; and along both edges of the film 8 in the leader 8A is formed a magnetic track J3, formed between the first and second perforations 8a and 8b, in which information upon the whole film 8 and upon conditions to reproduce the film image is recorded. In this connection, each frame F is made by coating a base film of the film 8 with photographic emulsion of silver salt.

Figure 3:
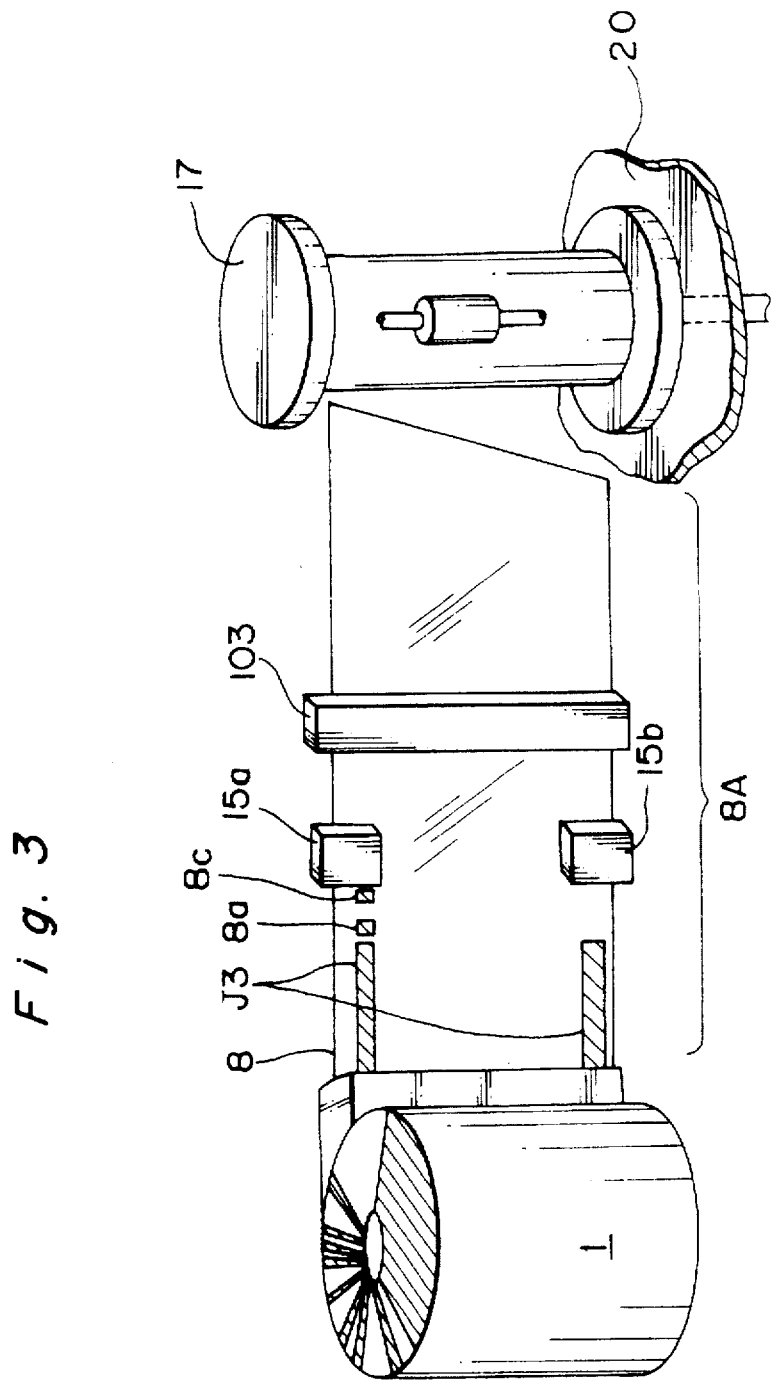
FIG. 3 is an explanatory, perspective view showing a relative position between a leader of the film pulled out of the cartridge case shown in FIG. 1, a pair of magnetic heads, an image-pickup element and a film-winding spool.

Meanwhile, as shown in FIG. 4, the image reproducing apparatus 10 has a cartridge chamber in which the film cartridge 1 is set in an axial direction thereof with respect to the cartridge chamber. The apparatus 10 is so constructed that a film-rewinding fork provided in the cartridge chamber is once pushed down by the spool 2 of the film cartridge 1 when the cartridge 1 is set inside the cartridge chamber, and then the film-rewinding fork gets to engage with the driving hole 2a of the spool 2 of the film cartridge 1 when the fork starts rotating. When an ejector table 13 for carrying and setting the film cartridge 1 inside the apparatus 10 is closed after the film cartridge 1 is set on the ejector table 13, it is detected by a sensor, not shown in the figure, that the film cartridge 1 or the film 8 is set at a predetermined position as shown in FIG. 3. This image reproducing apparatus 10 is provided with a pair of independent sensors: one sensor for reading the bar code 6 of the data disk 3 of the film cartridge 1, and the other sensor as an encoder for detecting the position of the abovementioned perforations 8a–8e for positioning a desired frame F of the film 8 with respect to the image reproducing apparatus 10.

A film-feeding mechanism provided in the image reproducing apparatus 10 is so controlled that the data disk 3 stops rotating with the arrow 5 thereon pointing to the mark "PROCESSED" shown on the film case 4 at the time of finishing rewinding the film 8 inside the cartridge case 4 of the cartridge 1 or at the time of taking the film cartridge 1 out of the cartridge chamber of the image reproducing apparatus 10. Incidentally, the film cartridge 1 has a lock mechanism (not shown in the figure) for preventing the data disk 3 from rotating carelessly when the cartridge 1 is taken out of the cartridge chamber of the apparatus 10, because if the data disk 3 rotates carelessly when the film cartridge 1 is outside the apparatus 10, there arises a possibility that how the film 1 is used by the user may be wrongly displayed.

FIG. 3 shows a positional relation, at the time when the film 8 is being rewound inside the cartridge case 4 with the apparatus 10 being loaded with the film cartridge 1, between the leader 8A of the film 8, an image-pickup element 103 (CCD) for picking up images of the film 8, a pair of magnetic heads 15a and 15b as means for reading the magnetic tracks J1, J2 and J3 of the film 8, and a film-winding spool 17 constituting a part of the film-feeding mechanism provided in the image reproducing apparatus 10. In the figure, reference numerals 1, 8A and J3 indicate the film cartridge, the leader of the film 8, and the magnetic track of the leader 8A, respectively; 20 and 17 indicate a frame of the image reproducing apparatus 10, and the film-winding spool which is rotatably provided on the frame 20 and driven by a driving mechanism (not shown in the figure) mounted in the apparatus 10, respectively; and 15a and 15b indicate the pair of magnetic heads, which are provided in the apparatus 10, for reading the magnetic tracks J1–J3 of the film 8, respectively. The pair of magnetic heads 15a and 15b are so constructed that they are moved to touch the magnetic track J3 of the film 8 to read film information recorded therein when the film 8 is rewound inside the cartridge case 4 of the cartridge 1, and the magnetic heads 15a and 15b are retracted from a reading position as shown in the figure to a retracting position not shown in the figure after the reading operation of the magnetic heads 15a and 15b is over. More detailed description on the synchronous relation between the film-feeding operation and the reading operation of the magnetic heads 15a and 15b will be made later.

The image reproducing apparatus 10 is connected to a monitor TV 12 by a pair of electric cables K1 and K2 as shown in FIG. 4, which makes it possible that images recorded in the film 8 of the cartridge 1 set in the apparatus 10 is visually reproduced on an image plane 11 of the monitor TV 12. As shown in the figure, on the left front of the apparatus 10 is provided the ejector table 13 for carrying and setting the film cartridge 1 inside the apparatus 10; just above the ejector table 13 is disposed a power switch PWS to switch on and off the apparatus 10; on the right upper front of the apparatus 10 is provided a display part 10c for displaying various kinds of information; and just below the display part 10c are provided a number of switches 10b in two rows extending horizontally. The monitor TV 12 has a speaker 9 on one side thereof, by which background music is outputted while a film image is shown up on the image plane 11 of the monitor TV 12.

In the following, it is explained about a block construction of an electric circuit used for controlling the image reproducing apparatus 10, according to FIG. 5. In the figure, a reference numeral 100 is a light source part for emitting uniform light to the film 8 to pick up the image recorded therein; 101 is a photo reflector functioning as an encoder which detects the perforations 8a–8d of the film 8 and outputs the detection signals to a CPU; 102 is a diaphragm control part which controls the amount of light incident upon an image-pickup element (CCD); 103 is the image-pickup element; 104 is an analogue-dealing part which carries out, for example, sampling of signals outputted from CCD 103; 105 is an A/D converter which outputs RGB data; 106 is a processor which converts the RGB data to signals of brightness and/or color difference and which accomplishes a gamma compensation; 107 is a memory which stores image data outputted from the processor 106; 108 is an operation control part which reads the image data stored in the memory 107 and which decides a way of reproducing such as zooming and panning; 109 is a memory which stores the images read by the operation control part 108; 110 is a processor which converts the image signals stored in the memory 109 to NTSC signals; 111 is an address controller which controls reading/writing addresses of the memories 107 and 109; 112 is a photometric part which measures the amount of light emitted from the light source part 100 and outputs the resulting data to the CPU; 113 is a film-feeding driver which feeds the film 8; 113a is a motor provided in the film-feeding driver 113; 114 is a timing generator which outputs a timing signal to each of the abovementioned blocks; 115 is a ejector driver which opening/closing the ejector table 13; 116 is a generator of synchronizing signals (SSG); 117 is the CPU which controls the whole operation of the image reproducing apparatus 10; 118 is a magnetic part, having a magnetic head 15b, which reads the magnetic information upon picture-taking stored in the magnetic track J1 of the film 8 and which writes information decided by the apparatus 10; 119 is a magnetic part, having a magnetic head 15a, which reads the magnetic information upon development stored in the magnetic track J2; 120 and 121 are a pair of photo reflectors (P1 and P2) which read the bar code 6 of the data disk 3, respectively; 123 is a LCD which displays a mode of the apparatus 10 or a state of a desired frame F whose image is to be reproduced or a warning; 122 is a display driver which operates the LCD 123; 124 is a power source which supplies electric power to each of the abovementioned blocks; PWS is a power switch; EJS is a switch which turns on and off the ejector driver 115; PLS is a play switch; and INS is a film-winding detection switch which detects whether or not the film 8 is wound around the film-winding spool 17. When the photo reflector (encoder) 101 detects the perforations 8a–8e formed on the film 8, the detection signals are sent to the CPU 117, whereby the film-feeding driver is controlled. Also, when the light emitted from the light source part 100 is measured by the photometric part 112 and the resulting data obtained through the measurement is outputted to the CPU 117, the CPU 117 decides the amount of the light.

In the following, it is explained about an operation of the image reproducing apparatus 10 in which the mechanism for reading film information is provided, according to flow charts shown in FIGS. 6 and 7.

Figure 6:
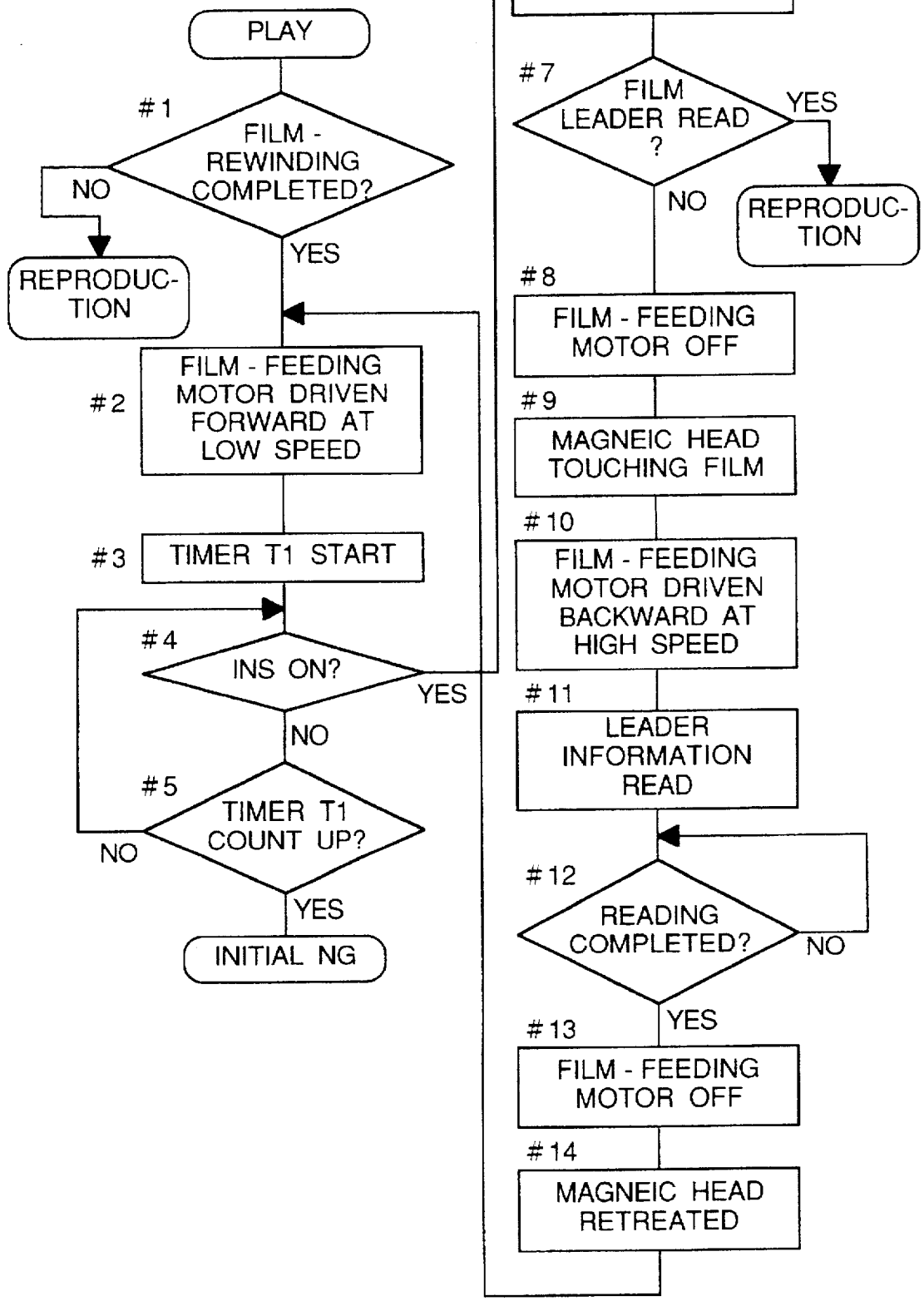
FIG. 6 is a flow chart showing a fundamental flow of film-image reproducing operations carried out by the system for reproducing film images.

FIG. 6 is a flow chart showing a main operation carried out by the image reproducing apparatus. When the play switch PLS is switched on, it is decided whether or not the film 8 is rewound inside the film cartridge 1 at step #1. If the film rewinding is not completed, it is decided at this step #1 that the film 8 is now in a state that it is possible that the film image thereof is reproduced, with some film 8 being fed out from the cartridge case 4, and that the operation to reproduce the film image is started immediately. On the other hand, if it is decided at this step that the film rewinding is completed, it proceeds to step #2 at which the film-feeding motor 113a is driven forward at a low speed, thus feeding out the film 8 from the cartridge case 4 at a low speed.

Next, after starting the timer T1, which is set a predetermined time, at step #3, it is decided whether or not the film-winding detection switch INS is switched on while the timer T1 is counting the time at steps #4 and #5. Here, if it is decided that the detection switch INS is switched on, it proceeds to the following step #6; on the other hand, if it is decided that the detection switch INS is not switched on and the timer T1 counts up the predetermined time, it proceeds to the following initial NG routine, regarding the initial load of the film leader 8A as a failure.

That is, if it is decided at step #4 that the film winding detection switch INS is switched on, it proceeds to step #6 at which the timer T1 is reset, and then it proceeds to step #7 at which it is decided whether or not the film information recorded in the magnetic track J3 of the film leader 8A is read. And if it is decided that the film information is read at the step, the operation to reproduce the film image is started.

Meanwhile, if it is decided at step #7 that the film information of the magnetic track J3 is not yet read, for example, in such a case as the image reproducing apparatus 10 is newly loaded with a film cartridge 1 and is to reproduce the image of the film 8 for the first time, it proceeds to step #8 at which the film-feeding motor 113a is switched off.

Next, at step #9, in order to read the film information recorded in the magnetic track J3 of the film leader 8A, the magnetic heads 15a and 15b are moved from the retracing position to the reading position at which the leader 8A of the film 8 is touched and pressed by the magnetic heads 15a and 15b.

Next, it proceeds to steps #10 and #11 at which the film-feeding motor 113a is driven backward at high speed in order to rewind the film leader 8A inside the film cartridge 1, and the film leader 8A is read by the magnetic heads 15a and 15b. When the film 8 is fed out from the cartridge case 4, the film feeding motor 113a is driven forward at a low speed to make sure that the film 8 is reliably fed therefrom. On the other hand, when the film information of the magnetic track J3 of the film leader 8A is read, it is necessary to feed backward the film 8 with respect to the magnetic heads 15a and 15b at a high speed; that is, the film-feeding motor 113a is driven backward at a high speed.

Next, if it is decided at step #12 that the film information recorded in the magnetic track J3 of the film leader 8A is read, it proceeds to step #13 at which the film feeding motor 113a is switched off.

Next, it proceeds to step #14 at which the magnetic heads 15a and 15b are retracted from the reading position to the retracting position, and the same process after step #2 is repeated.

Figure 7:
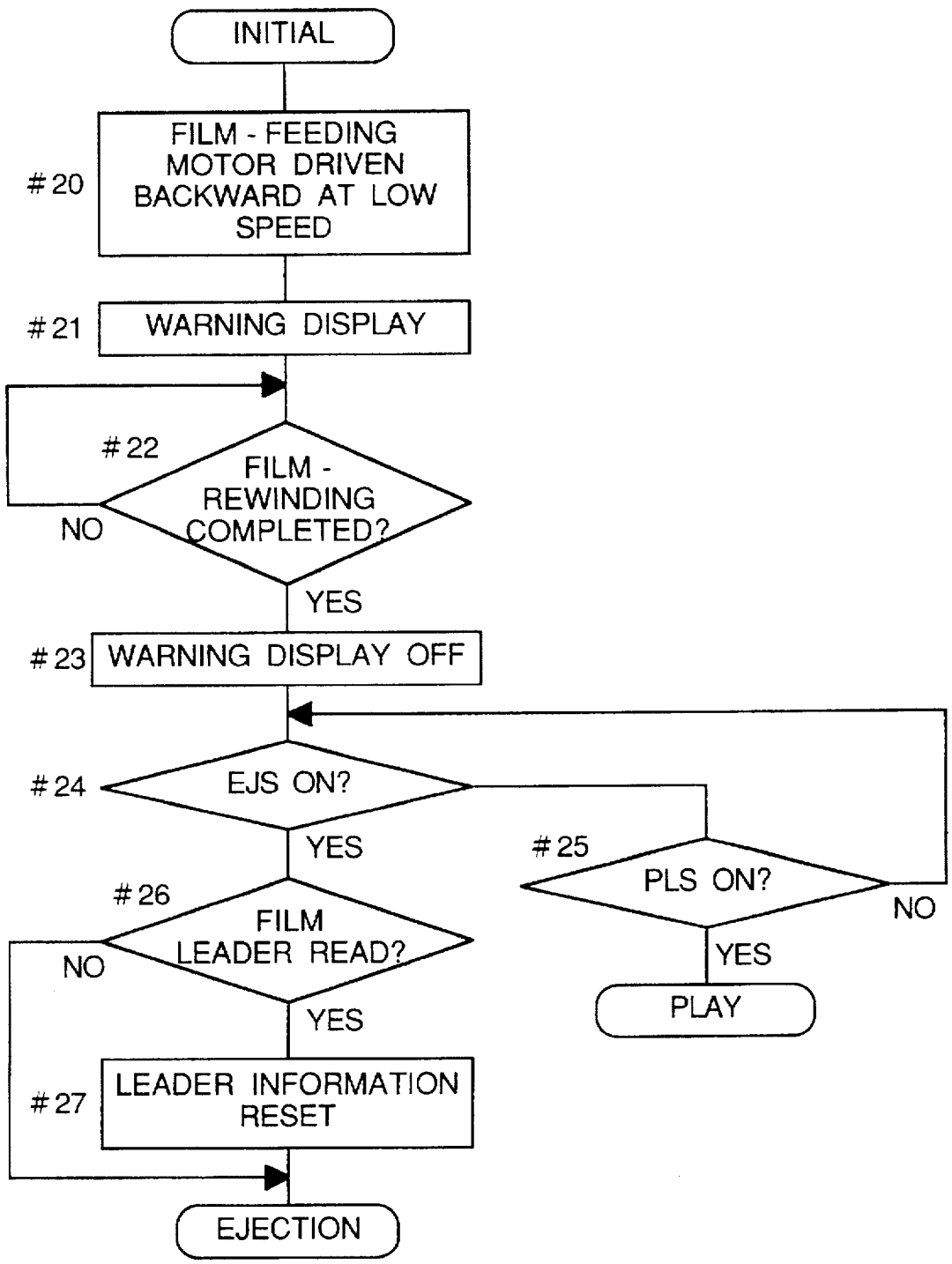
FIG. 7 is a flow chart showing an operation carried out by the system the initial loading ends in failure.

Meanwhile, in case that the film-winding detection switch INS is not switched on and the timer T1 counts up the predetermined time at step #5, it proceeds to the initial NG routine as shown in FIG. 7. In the following, it is explained about the initial NG routine, with reference to this figure.

First, at step #20, the film-feeding motor 113a is driven backward at a low speed to rewind the film 8 inside the cartridge case 4.

Next, after displaying a warning on the display part 10c, provided on the front surface of the image reproducing apparatus 10, which shows a failure of the initial loading of the film leader 8A at step #21, it proceeds to step #22 at which the film 8 is completely rewound inside the cartridge case 4.

Next, the warning is switched off when the rewinding of the film 8 is completed at step #23, and then it proceeds to step #24 at which it is decided whether or not the ejector switch EJS is on. If it is decided at this step that the switch EJS is not on, it proceeds to step #25 at which it is decided whether or not the play switch PLS is on. Here, if it is decided at the step #25 that the play switch PLS is on, it proceeds to the abovementioned routine shown in FIG. 6 and the same operation to reproduce the film image is repeated.

Meanwhile, if it is decided at step #24 that the ejector switch EJS is on, it proceeds to step #26 at which it is decided whether or not the film information of the magnetic track J3 of the film leader 8A is read. If it is decided at this step #26 that the film information is not yet read, it directly proceeds to the step at which the ejecting operation is carried out. On the other hand, if it is decided at the step #26 that the film information is already read, it proceeds to step #27 at which the information upon the film leader 8A stored in the memory is reset, judging that there is a possibility that the image reproducing apparatus 10 is loaded with the same film cartridge again 1 or another film cartridge 1. And, after this operation, it proceeds to the step to carry out the ejecting operation.

Figure 8:
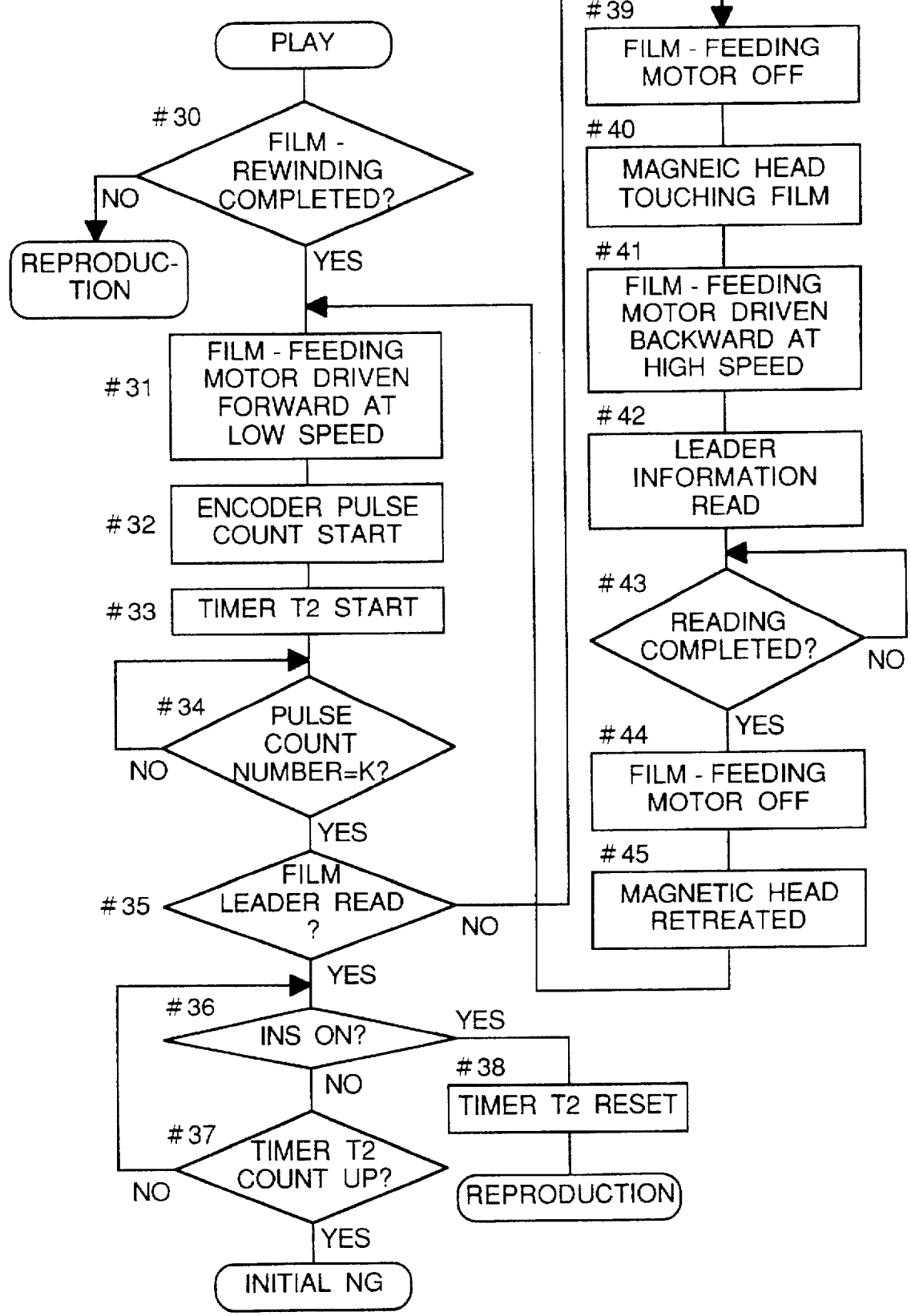
FIG. 8 is a flow chart, similar to FIG. 6, according to a modification of the embodiment.

It will be appreciated that modifications may be made in our invention. For example, although the abovementioned mechanism for reading film information has the film-winding detection switch INS, and the routine to carry out the operation of the film-image reproduction is so constructed that the operation to reproduce the film image is started only after the film-winding detection switch INS is switch on, the mechanism can be so modified that in case that it is decided that the film information recorded in the magnetic track J3 of the film leader 8A is not yet read by the magnetic heads 15a and 15b when the film leader 8A is fed out of the film cartridge 1 up to a position at which the film information can be read by the magnetic heads 15a and 15b, the film information of the film leader 8A can be read by rewinding the film 8 inside the cartridge case 4 once after stopping the film feeding from the cartridge case 4, without waiting for the film winding detection switch being turned on or with no film winding detection switch being provided therein. In the following, it will be explained about the modified routine to carry out the operation to reproduce the film image reference to FIG. 8.

First, when the play switch PLS is switched on, it is decided at step #30 whether or not the film 8 is rewound inside the cartridge case 4. If it is decided at this step that the film 8 is not rewound inside the cartridge case 4, the film-image reproducing operation can be started immediately, judging that the film 8 is now in a state that it is possible that the image thereof is reproduced, with some film 8 being fed out from the cartridge case 4. On the other hand, if it is decided at step #30 that the film 8 is rewound inside the cartridge 1, it proceeds to step #31 at which the film feeding motor 113a is driven forward at low speed in order to feed out the film 8 from the cartridge case 4.

Figure 5:
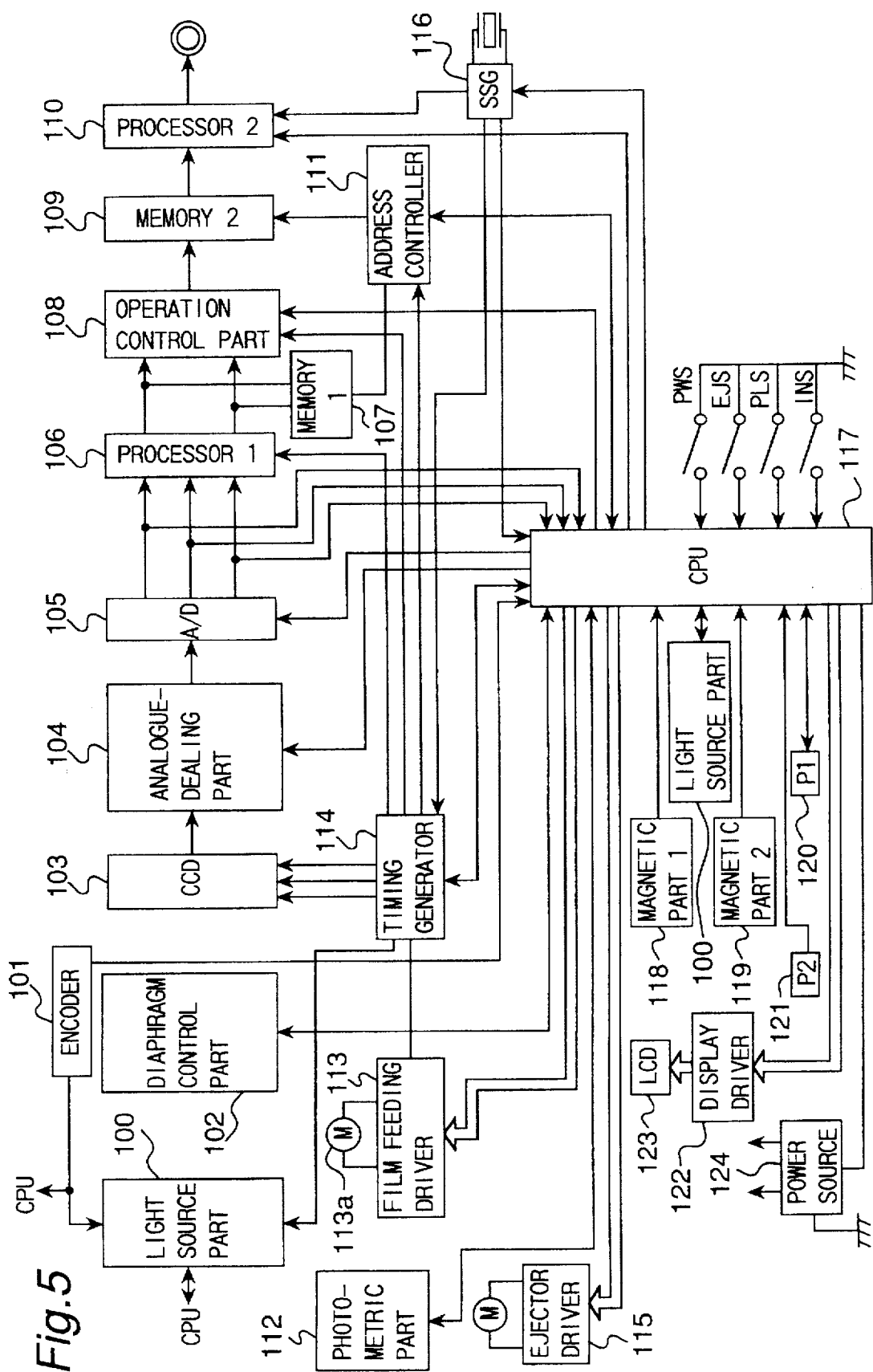
FIG. 5 is a block diagram showing a schematic construction of electric circuit used for controlling the system for reproducing film images.

Next, at step #32, it starts counting the pulse outputted from the encoder 101 shown in FIG. 5.

Next, after the timer T2 is started at step #33, the counting number of the pulse reaching a predetermined value K is waited at step #34. This predetermined value K is properly set on the basis of an amount of the film leader 8A, fed from the cartridge case 4, the edge of which passes the magnetic heads 15a and 15b; that is, the value K is properly set according to the amount of the film leader 8A, fed from the cartridge case 4, all the magnetic information recorded in the magnetic track J3 of which can be read when the film 8 is rewound inside the cartridge case 4. In this modification, as apparent from the construction of the film 8 shown in FIG. 2, a second perforation 8b at the rear end of the leader 8A is formed as a third perforation counting from the first one 8c located at the forefront of the leader 8A. Accordingly, if the encoder 101 is provided in the image reproducing apparatus at such a location as that at which the encoder 101 outputs the pulse signal indicating "three" when the edge of the film leader 8A passes the magnetic heads 15a and 15b at the time of feeding the film 8 from the cartridge case 4, the abovementioned value K is let as "three".

Next, it proceeds to step #35 at which it is decided whether or not the film information of the magnetic track J3 of the film leader 8A is already read. Here, if it is decided at this step that the film information is already read, it proceeds to step #36 at which it is decided whether or not the film-winding detection switch INS is turned on. And, if it is decided that the detection switch INS is turned on, it proceeds to step #38 at which the timer T2 is reset, and then the film-image reproducing operation is started.

Meanwhile, if it is decided at step #36 that the film-winding detection switch INS is not switched on, and if it is decided at step #37 that the timer T2 counts up a predetermined time, then, it proceeds to the initial NG routine shown in FIG. 7 where the same operation as mentioned above is repeated.

Meanwhile, if it is decided at step #35 that the film information of the magnetic track J3 of the film leader 8A is not yet read, after it proceeds to steps #39 through #45 which are provided corresponding to steps #8 through #14 in one-to-one correspondence, it proceeds to step #31 at which the same operation as mentioned above is repeated.

Although the photo reflector or encoder 101 provided in the image reproducing apparatus according to the embodiment or modification, detects the perforations 8a through 8e formed in the film 8 optically, the mechanism can be so constructed that the detection of the perforations is carried out mechanically. Also, the mechanism for reading film information can be so constructed that the number of rotations of the film-feeding motor 113a is directly monitored by a monitoring device, in stead of using the film-winding detection switch INS and/or using the pulse outputted from the encoder 101, and that the information recorded in the leader 8A of the film 8 is read by rewinding the film 8, which is fed out a predetermined length from the film cartridge, when the film-feeding motor 113a reaches a predetermined number of rotations.

According to the system for reproducing film images of the present invention, because the film information recorded in the magnetic track of the film leader is read when the film is rewound into the cartridge case, even if the film leader has not enough length, the flatness of the magnetic track is ensured and the magnetic track is touched by the magnetic head uniformly, thus preventing the failure in reading the film information recorded therein with higher reliability.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A system for reproducing a film image comprising:
   a film cartridge which has a length of film which is housed inside the film cartridge, with a tip of a leader of the film being housed therein, the leader having a recording area for recording film information,
   a film-feeder which feeds the film from the film cartridge to a film-winding spool so as to wind the film around the film-winding spool and which feeds the film from the film-winding spool to the film cartridge,
   a reader which reads the film information of the leader, and
   a controller which controls said film feeder and said reader to partially feed film out of the cartridge by an amount such that the leader is fed out of the film cartridge without reading the information recorded on the leader portion of the film and to subsequently rewind the film into the cartridge and read the information recorded on the leader portion of the film as the film is being rewound into the film cartridge.

2. The system as claimed in claim 1, wherein the controller controls the film-feeder so that the film is fed again from the film cartridge to the film-winding spool, after the film information of the leader is read by the reader.

3. The system as claimed in claim 1, wherein the amount of the film which is partially fed from the film cartridge is an amount sufficient to cause the leader to pass the reader for enabling the reader to read the film information of the leader when the film is being rewound inside the film cartridge.

4. The system as claimed in claim 1, further comprising a sensor, electrically connected to the controller, which detects if the film is wound around the film-winding spool, wherein the partially-fed amount of the film that is fed from the film cartridge to the film-winding spool is the amount which has been fed when the sensor detects that the film is wound around the film-winding spool.

5. The system as claimed in claim 4, wherein the controller controls the film-feeder so that the film is fed again from the film cartridge to the film-winding spool, after the film information of the leader is read by the reader.

6. The system as claimed in claim 1, wherein the film has a recording area for recording a film image which comprises a layer of silver salt, wherein the recording area for recording film information is sandwiched in between the tip of the leader and the recording area for recording the film image disposed nearest to the tip of the leader, and wherein the film used in the system is developed.

7. The system as claimed in claim 1, wherein the recording area for recording the film information comprises a magnetic recording medium, and the reader comprises a magnetic sensor.

8. A system for reproducing a film image comprising:
 a film, housed in a film cartridge with a tip of a leader of the film being housed therein, which film has a first recording area for recording film information and a second recording area for recording an image,
 a reading sensor for reading film information recorded in the first recording area,
 a photoelectric transfer element for reading a film image recorded in the second recording area,
 a detecting sensor which detects if the film is set at a predetermined position,
 a film-feeding unit which feeds the film from the film cartridge to the reading sensor so as to enable the film information to be read by the reading sensor and which rewinds the film inside the film cartridge, and
 a controller which controls the film-feeding unit and the reading sensor to partially feed film from the film cartridge by an amount such that the leader of the film is fed out from the film cartridge without reading the information recorded on the first recording area of the film and to subsequently rewind the film into the cartridge and read the information recorded on the first recording area of the film as the film is being rewound into the film cartridge.

9. The system as claimed in claim 8, wherein the first recording area is provided in the leader of the film.

10. The system as claimed in claim 9, wherein the first recording area of the film comprises a magnetic recording medium, and the reading sensor comprises a magnetic head.

11. The system as claimed in claim 8, wherein the amount of the film that is partially fed from the film cartridge is an amount sufficient to cause the leader of the film to pass the reading sensor, to thereby enable the reading sensor to read the film information of the leader when the film is being rewound inside the film cartridge.

12. The system as claimed in claim 8, wherein the controller controls the film-feeding unit so that the film is fed again from the film cartridge past the photoelectric transfer element, after the film information of the first recording area is read by the reading sensor.

13. The system as claimed in claim 12, wherein the photoelectric transfer element and the reading sensor are located along the same passage of the film.

14. A mechanism able to read film information which is recorded in a recording area adjacent to a tip of a film having a photographed image after development, wherein the film is inside a cartridge case with the tip thereof being housed in the cartridge case, comprising:
 a film-feeder having a driving motor for feeding the film selectively from the cartridge case to a film-winding spool and from the film-winding spool to the cartridge case,
 a reader for reading the film information from the recording area of the film which is being fed by the film-feeder, and
 a controller which is electrically connected to both the film-feeder and the reader, wherein the controller controls the film-feeder and the reader so as to:
  (a) feed the film the cartridge case without reading information from the recording area of the film, and stop the feeding when the film is partially fed out by an amount such that a leader of the film has been fed out from the cartridge case,
  (b) rewind the film inside the cartridge case while the film information on the recording area of the film is read by the reader, and then
  (c) feed the film again from the cartridge case after the reading of the film information by the reader is finished.

15. The mechanism as claimed in claim 14, further comprising a photoelectric transfer element which is connected to the controller, wherein the photoelectric transfer element reads the photographed image from the film which is being fed from the cartridge case after the reading of the recording area by the reader is finished.

16. The mechanism as claimed in claim 14, wherein the recording area of the film comprises a magnetic recording medium, and the reader comprises a magnetic sensor.

17. A method of reading film information from a recording area for recording the information provided in a film, having a photographed image, in a cartridge case, inside which the film is housed with a tip of a leader being housed therein, used in an apparatus in which the photographed image of the film is read at a location between the cartridge case and a film-winding spool while the film is fed from the cartridge case to the film-winding spool, comprising:
 feeding the film from the cartridge case to the film-winding spool without reading information from the recording area;
 stopping the feeding of the film to the film-winding spool when it is detected that the film is partially fed out of the cartridge case by an amount such that the leader of the film has been fed out of the cartridge case;
 rewinding the film inside the cartridge case;
 reading the film information from the recording area of the film by a reader which reads the information while the film is being rewound inside the cartridge case; and
 feeding the film again from the cartridge case to the film-winding spool after completion of reading the film information.

18. The method as claimed in claim 17, in which the photographed image of the film is read by a photoelectric transfer element.

19. A system for reproducing a film image comprising:
 a film cartridge which has a length of film which is housed inside the film cartridge with a tip of a leader thereof being housed therein, the leader having a recording area for recording film information,
 a film-feeder which feeds the film from the film cartridge to a film-winding spool so as to wind the film around the film-winding spool and which feeds the film from the film-winding spool to the film cartridge, a reader which reads the film information of the leader while the film is being fed from the film-winding spool to the film cartridge by the film-feeder, prior to reading a film image for reproducing the film image, and a controller which controls said film feeder and said reader to partially feed film out of the cartridge by an amount such that the leader is fed out of the film cartridge without reading the information recorded on the leader portion of the film and to subsequently rewind the film into the cartridge and read the information recorded on the leader portion of the film as the film is being rewound into the film cartridge.

20. The system as claimed in claim 19, wherein said controller controls the film-feeder so that, after a predetermined amount of film is fed from the film cartridge to the film-winding spool, the film is fed from the film-winding spool to the film cartridge.

21. The system as claimed in claim 20, wherein the controller controls the film-feeder so that the film is fed again from the film cartridge to the film-winding spool, after the film information of the leader is read by the reader.

22. The system as claimed in claim 20, wherein the predetermined amount of film is an amount sufficient to cause the leader to pass the reader for enabling the reader to read the film information of the leader when the film is being rewound inside the film cartridge.

23. The system as claimed in claim 20, further comprising a sensor, electrically connected to the controller, which detects if the film is wound around the film-winding spool, wherein the predetermined amount of the film that is fed from the film cartridge to the film-winding spool is the amount that has been fed when the sensor detects that the film is wound around the film-winding spool.

24. The system as claimed in claim 23, wherein the controller controls the film-feeder so that the film is fed again from the film cartridge to the film-winding spool, after the film information of the leader is read by the reader.

25. The system as claimed in claim 19, wherein the film has a recording area for recording a film image which comprises a layer of silver salt, wherein the recording area for recording film information is sandwiched in between the tip of the leader and the recording area for recording the film image disposed nearest to the tip of the leader, and wherein the film used in the system is developed.

26. The system as claimed in claim 19, wherein the recording area for recording the film information comprises a magnetic recording medium, and the reader comprises a magnetic sensor.

27. A system for reproducing a film image comprising:

a film, housed in a film cartridge with a tip of a leader of the film being housed therein, which has a first recording area for recording film information and a second recording area for recording an image, a reading sensor for reading film information recorded in the first recording area, a photoelectric transfer element for reading a film image recorded in the second recording area, a detecting sensor which detects if the film is set at a predetermined position, a film feeding unit which feeds the film from the film cartridge to the reading sensor so as to enable the film information to be read by the reading sensor and which rewinds the film inside the film cartridge, and a controller which controls the film-feeding unit and the reading sensor so that the film is partially fed out of the film cartridge by an amount such that the leader is fed out of the film cartridge without reading information of the first recording area, and thereafter said information is read by the reading sensor while the film is being rewound inside the film cartridge, prior to reading the film image by the photoelectric transfer element.

28. The system as claimed in claim 27, wherein the first recording area is provided in the leader of the film.

29. The system as claimed in claim 27, wherein the controller controls the film-feeding unit so that, after the film is fed a predetermined amount from the film cartridge after loading it, the film is rewound inside the film cartridge.

30. The system as claimed in claim 29, wherein the predetermined mount of the film is an amount sufficient to cause the leader of the film to pass the reading sensor to enable the reading sensor to read the film information of the leader when the film is being rewound inside the film cartridge.

31. The system as claimed in claim 27, wherein the controller controls the film-feeding unit so that the film is fed again from the film cartridge past the photoelectric transfer element, after the film information of the first recording area is read by the reading sensor.

32. The system as claimed in claim 31, wherein the photoelectric transfer element and the reading sensor are located along the same path for passage of the film as it is fed by said film feeding unit.

33. The system as claimed in claim 28, wherein the first recording area of the film comprises a magnetic recording medium, and the reading sensor comprises a magnetic head.

34. A mechanism able to read film information which is recorded in a recording area adjacent to a tip of a film having a photographed image after development, wherein the film is inside a cartridge case with a tip of the film being housed therein, comprising:

a film-feeder having a driving motor for feeding the film selectively from the cartridge case to a film-winding spool and from the film-winding spool to the cartridge case, a reader for reading the film information from the recording area of the film which is being fed by the film-feeder, and a controller which is electrically connected to both the film-feeder and the reader, wherein the controller controls the film-feeder and the reader, prior to reading a film image for reproducing the image, so as to:

(a) feed the film from the cartridge case without reading information from the recording area, and stop the feeding of the film when the film is fed a predetermined amount from the cartridge case, (b) rewind the film inside the cartridge case while the film information of the recording area of the film is read by the reader, and then (c) feed the film again from the cartridge case after the reading of the film information by the reader is finished.

35. The mechanism as claimed in claim 34, further comprising a photoelectric transfer element which is connected to the controller, wherein the photoelectric transfer element reads the photographed image from the film which is being fed from the cartridge case after the reading of the recording area by the reader is finished.

36. The mechanism as claimed in claim 34, wherein the recording area of the film comprises a magnetic recording medium, and the reader comprises a magnetic sensor.

37. A method of reading film information from a recording area for recording the information provided in a film, having a photographed image, in a cartridge case, inside which the film is housed with a tip of a leader thereof being housed therein, and that is used in an apparatus in which the photographed image of the film is read at a location between the cartridge case and a film-winding spool while the film is fed from the cartridge case to the film-winding spool, comprising:

feeding the film from the cartridge case to the film-winding spool without reading information from the recording area;

stopping the feeding of the film to the film-winding spool when it is detected that the film is fed out of the cartridge case a predetermined amount;

rewinding the film inside the cartridge case;

reading the film information from the recording area of the film by a reader which reads the information while the film is being rewound imide the cartridge case; and feeding the film again from the cartridge case to the film-winding spool so as to read the film image for reproducing it, after completion of reading the film information.

38. The method as claimed in claim 37, in which the photographed image of the film is read by a photoelectric transfer element.

* * * * *